UNITED STATES PATENT OFFICE.

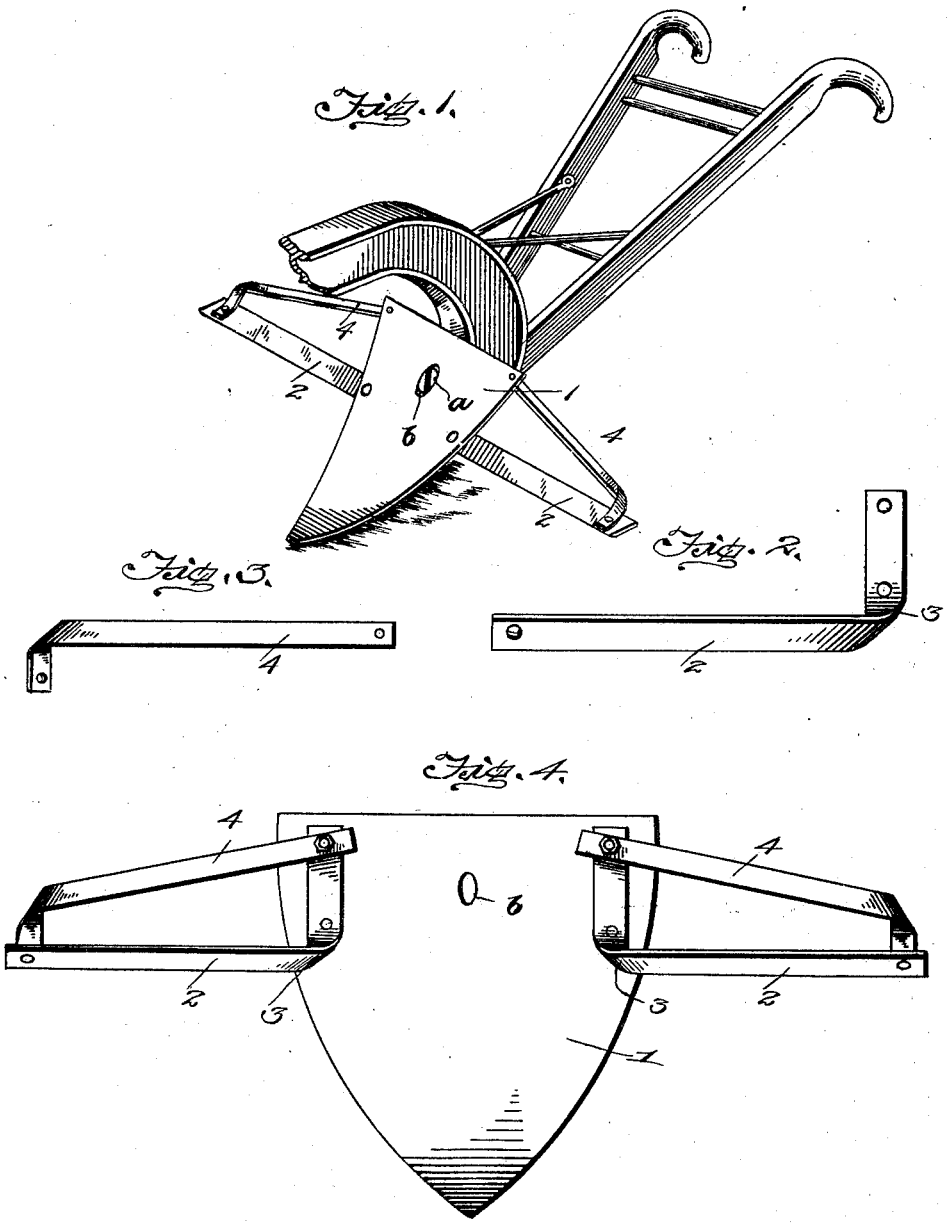

JOHN M. ROBINSON, OF GOLDTHWAITE, TEXAS.

WEED-CUTTING ATTACHMENT FOR PLOWS.

SPECIFICATION forming part of Letters Patent No. 707,801, dated August 26, 1902.

Application filed May 29, 1902. Serial No. 109,467. (No model.)

*To all whom it may concern:*

Be it known that I, JOHN M. ROBINSON, a citizen of the United States, residing at Goldthwaite, in the county of Mills and State of Texas, have invented certain new and useful Improvements in Weed-Cutting Attachments for Plows; and I do declare the following to be a full, clear, and exact description of the invention, such as will enable others skilled in the art to which it appertains to make and use the same.

The invention relates to weed-cutting devices for plows, and has for its object to provide the shovel of a plow or cultivator with blades or knives which are adapted to enter the soil a slight distance and cut down or uproot all weeds or grass and at the same time to smooth and pulverize the soil.

A further object is to provide a device of the character described which shall be simple and inexpensive of construction, strong and durable in use, and well adapted for the use to which it is designed, and which may be readily applied to plows or cultivators now in use.

With these and other objects in view the invention consists of certain novel features of construction, combination, and arrangement of parts, which will be hereinafter more fully described and particularly pointed out in the appended claims.

In the accompanying drawings, Figure 1 is a perspective view of a portion of a plow, showing the application of my device. Fig. 2 is a detail perspective view of one of the blades detached. Fig. 3 is a similar view of one of the brace-rods; and Fig. 4 is a rear view of the shovel, showing the manner of attaching the blades.

Referring to the drawings, 1 denotes the shovel of an ordinary plow or cultivator, which is secured to the beam by a bolt $a$, passing through the elongated aperture $b$.

2 denotes the blades or knives, which consist of narrow flat bars of steel, the inner ends 3 of which are bent or twisted at an angle to the blade and bolted to the back side of the plow-shovel near the upper edge of the same.

4 denotes brace-rods connected at their outer ends to the free ends of the cutting-blades and at their inner ends to the plow-shovel.

It will be noticed that the manner in which the cutting-blades are bent at the point of their connection with the shovel gives the said blades the proper pitch or inclination to enter the ground to the proper depth and cut the weeds at their roots or entirely uproot the same and cultivate the soil on both sides of the plow-shovel.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a cutting attachment for plows, the combination of the plow-shovel, the cutting-blades attached to the shovel, and brace-rods connecting the outer ends of said blades with said shovel, substantially as set forth.

2. In a weed-cutting attachment for plows and cultivators, the combination of the plow-shovel, the cutting-blades attached to the shovel and having their attaching ends bent and twisted at an angle to said blades so that when bolted to said shovel the blades will lie at the proper cutting angle, and brace-rods connecting the outer ends of said blades to the plow-shovel, substantially as set forth.

In testimony whereof I have hereunto set my hand in presence of two subscribing witnesses.

JOHN M. ROBINSON.

Witnesses:
O. H. YARBOROUGH,
JNO. J. COX.